United States Patent Office 3,396,518
Patented Aug. 13, 1968

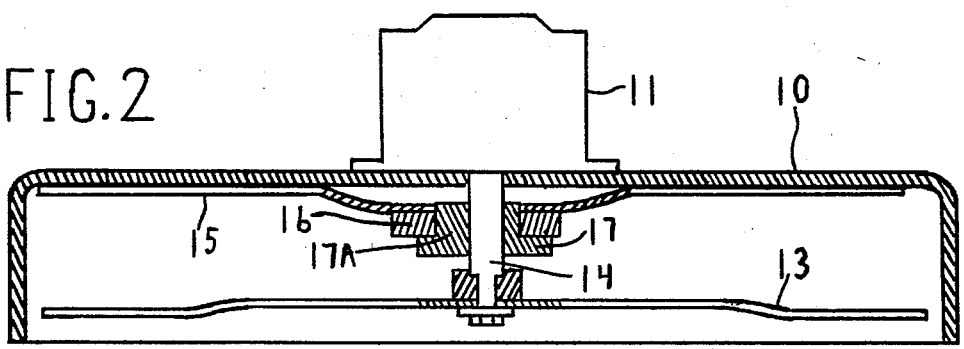
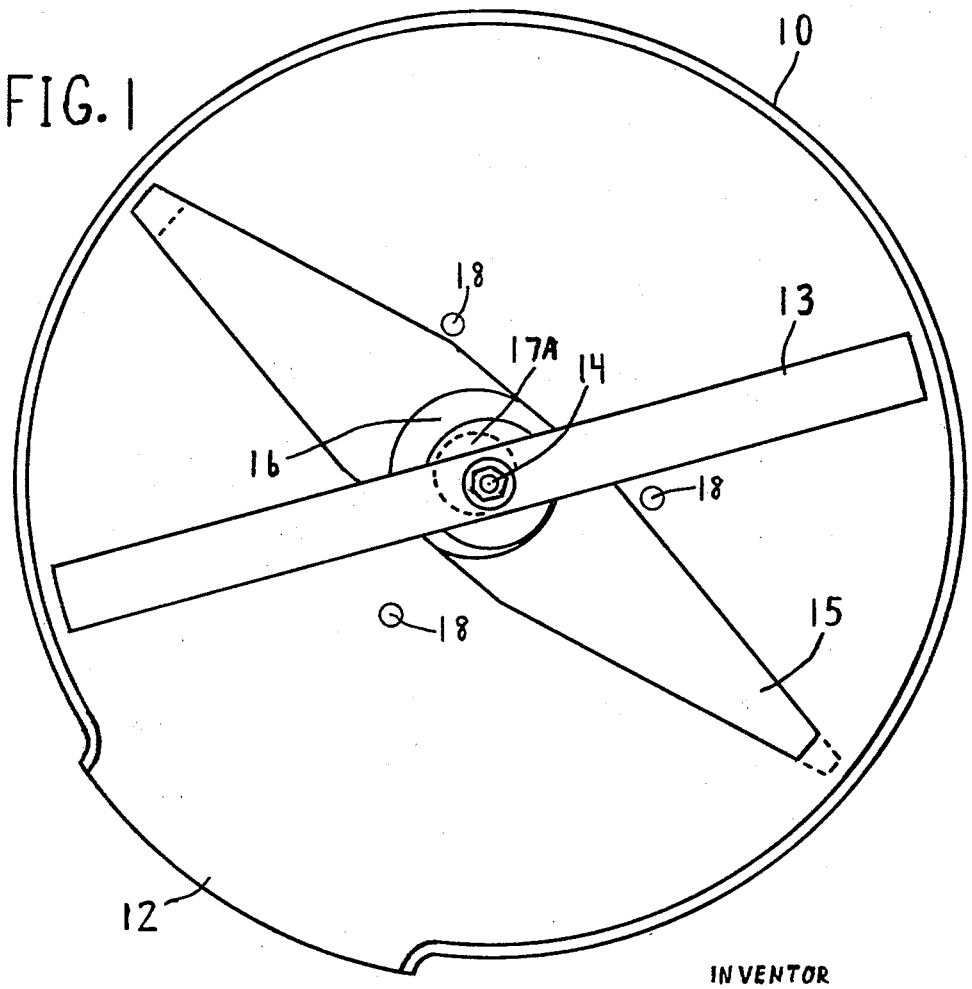

3,396,518
ROTARY POWER LAWN MOWER
Earl B. Johnson, R.D. 4, Box 252,
Freehold, N.J. 07728
Filed Apr. 21, 1965, Ser. No. 449,816
5 Claims. (Cl. 56—25.4)

This invention relates to a unique method for cleaning cut grass and other debris from the underside of the housing of rotary mowers.

The primary object is to provide a scraper that is in direct contact with the underside of the housing and thereby remove any cut grass and other debris from this area.

Another object provides a simple and practical way to actuate the scraper.

Still another object provides a comparatively slow movement of the scraper which is carried and operated directly from the comparatively high speed motor shaft.

These and other objects will be apparent to those familiar with rotary mowers.

My invention consists of an arrangement of parts whereby these objectives are accomplished as herein set forth, pointed out in the claims and illustrated in the accompanying drawings, in which:

FIGURE 1 is a bottom view of the housing of a rotary mower with my invention installed therein; and FIGURE 2 is a sectional elevation of FIGURE 1.

In these drawings I have used the numeral 10 to designate the housing proper, the motor 11, the housing throat 12 and the rotary cutting blade 13, which is detachably secured to the motor shaft 14.

To this structure I have added the scrapper 15 which is preferably made from a material that will flex without bending this scraper 15 is secured to the ring bearing 16 and the scraper 15 is held in contact with the underside of the housing 10 by the flange 17 of the offset cam bearing 17A which is secured to the motor shaft 14 by a set screw or other suitable means.

This cam bearing 17A actuates the scraper 15 in an eccentric circular movement and thereby moves the scraper around as the mower runs and removes cut grass and other debris from the underside of the housing.

The top of the housing 10 is provided with observation openings 18 so the scraper 15 can be seen by the operator as the scraper 15 moves slowly around. The holes 18 also serve as air vent openings and aid in quick removal of cut grass and other debris from within the housing 10.

Some changes may be made in the structure, installation and application without departing from the primary objectives and scope of this invention in which I claim:

1. A rotary mower comprising a housing, a motor, motor shaft and a horizontal cutting blade secured to said shaft and within the housing and a resilient scraper carried by said shaft, said scraper having a ring bearing, the axis of which is offset from the axis of said shaft, and engageable by and actuated in an eccentric circular movement by a cam bearing secured to said shaft and including means for holding said scraper in yieldable and movable contact with said housing.

2. A rotary mower comprising a housing, a motor, motor shaft and a horizontal blade secured to said shaft and within the housing and a resilient scraper carried by said shaft, said scraper having a ring bearing, the axis of which is offset from the axis of said shaft, engageable by and actuated in an eccentric circular movement by a cam and bearing secured to said shaft and with said scraper held in yieldable and movable contact with the underside of said housing by a flange on said cam and bearing.

3. A rotary mower comprising a housing, a motor with the motor shaft disposed within said housing and a horizontal cutting blade secured to said shaft and within the housing and a scraper carried by said shaft, said scraper having a free turning circular bearing, the axis of which is offset from the axis of said shaft and engageable by and actuated in an eccentric circular movement by an offset bearing, secured to said shaft and including means for holding said scraper movably adjacent to the underside of said housing.

4. A rotary mower comprising a housing, a motor with the motor shaft disposed within the housing and a horizontal cutting blade secured to said shaft and within the housing and a scraper carried by said shaft, said scraper having a free turning bearing, the axis of which is offset from the axis of said shaft and engageable by and actuated in an eccentric movement by an offset bearing secured to said shaft and with means for holding said scraper yieldably and movably adjacent to the underside of said housing.

5. A rotary mower comprising a housing, a motor with the motor shaft disposed within the housing and a horizontal cutting blade secured to said shaft within the housing and a scraper blade carried by said shaft, said scraper blade having a free turning circular bearing, the axis of which is offset from the axis of said shaft and engageable by and actuated in an eccentric movement by an offset bearing secured to said shaft and including means for holding said scraper movably adjacent to the underside of said housing.

References Cited

UNITED STATES PATENTS

| | | | |
|---|---|---|---|
| 2,796,714 | 6/1957 | Denney | 56—25.4 |
| 2,888,796 | 6/1959 | Denney | 56—25.4 |
| 2,957,295 | 10/1960 | Brown | 56—25.4 |
| 3,002,331 | 10/1961 | Denney | 56—25.4 |
| 3,157,978 | 11/1964 | McMullen | 56—295 |

ABRAHAM G. STONE, *Primary Examiner.*

P. A. RAZZANO, *Assistant Examiner.*